US011660674B2

(12) United States Patent
Riemann (10) Patent No.: US 11,660,674 B2
(45) Date of Patent: May 30, 2023

(54) CONTACT DETECTION IN ADDITIVE MANUFACTURING

(71) Applicant: FORMALLOY TECHNOLOGIES, INC., Spring Valley, CA (US)

(72) Inventor: Jeffrey L. Riemann, Spring Valley, CA (US)

(73) Assignee: FormAlloy Technologies, Inc., Spring Valley, CA (US)

( * ) Notice: Subject to any disclaimer, the term of this patent is extended or adjusted under 35 U.S.C. 154(b) by 160 days.

(21) Appl. No.: 17/112,601

(22) Filed: Dec. 4, 2020

(65) Prior Publication Data

US 2022/0176456 A1 Jun. 9, 2022

(51) Int. Cl.
| | |
|---|---|
| B22F 10/85 | (2021.01) |
| G05D 3/12 | (2006.01) |
| G05D 3/20 | (2006.01) |
| B23K 26/08 | (2014.01) |
| G01B 7/16 | (2006.01) |
| B33Y 30/00 | (2015.01) |
| B33Y 50/02 | (2015.01) |
| B22F 12/90 | (2021.01) |
| B22F 10/28 | (2021.01) |
| B33Y 10/00 | (2015.01) |
| B23K 26/342 | (2014.01) |

(52) U.S. Cl.
CPC .............. *B22F 10/85* (2021.01); *B22F 10/28* (2021.01); *B22F 12/90* (2021.01); *B23K 26/08* (2013.01); *B33Y 10/00* (2014.12); *B33Y 30/00* (2014.12); *B33Y 50/02* (2014.12); *G01B 7/18* (2013.01); *G05D 3/125* (2013.01); *G05D 3/20* (2013.01); *B23K 26/342* (2015.10)

(58) Field of Classification Search
CPC .......... B22F 10/85; B22F 10/28; B22F 12/90; B23K 26/08; B23K 26/342; B33Y 10/00; B33Y 30/00; B33Y 50/02; G01B 7/18; G05D 3/125; G05D 3/20; G05B 19/0426; Y02P 10/25
See application file for complete search history.

(56) References Cited

U.S. PATENT DOCUMENTS

| | | | | |
|---|---|---|---|---|
| 5,303,141 | A * | 4/1994 | Batchelder | B29C 41/36 156/244.11 |
| 10,086,467 | B2 * | 10/2018 | Burke | B23K 11/0013 |
| 10,155,346 | B1 * | 12/2018 | Gorgi | B29C 64/106 |
| 10,539,949 | B2 * | 1/2020 | Ho | B29C 64/393 |
| 11,014,163 | B2 * | 5/2021 | Preston | B33Y 50/02 |
| 11,331,684 | B2 * | 5/2022 | Katon | B05B 15/25 |
| 11,383,451 | B2 * | 7/2022 | Jones | G01B 11/0608 |
| 2016/0167156 | A1 * | 6/2016 | Burke | B33Y 30/00 219/76.12 |
| 2016/0354980 | A1 * | 12/2016 | Ho | B29C 64/40 |

(Continued)

Primary Examiner — Lawrence Averick
(74) Attorney, Agent, or Firm — Dinsmore & Shohl LLP (57) ABSTRACT

Certain aspects of the present disclosure provide a method for setting a working distance of an additive manufacturing system, including: moving a deposition element towards a build surface; detecting, via a contact detection system, a contact between the deposition element and the build surface; stopping the moving of the deposition element in response to detecting the contact between the deposition element and the build surface; and moving the deposition element away from the build surface a determined working distance.

27 Claims, 7 Drawing Sheets

(56) References Cited

U.S. PATENT DOCUMENTS

| | | | |
|---|---|---|---|
| 2017/0252812 A1* | 9/2017 | Mykulowycz | B22F 12/10 |
| 2018/0072000 A1* | 3/2018 | Riemann | B33Y 50/02 |
| 2018/0297113 A1* | 10/2018 | Preston | B33Y 70/10 |
| 2018/0297114 A1* | 10/2018 | Preston | B29C 64/165 |
| 2020/0361155 A1* | 11/2020 | Jones | G01B 11/0608 |
| 2021/0138495 A1* | 5/2021 | Katon | B05C 5/00 |

* cited by examiner

```
┌─────────────────────────────────────────────┐
│  MOVE A DEPOSITION ELEMENT TOWARDS A BUILD  │
│                  SURFACE                    │
│                    702                      │
└─────────────────────────────────────────────┘
                      │
                      ▼
┌─────────────────────────────────────────────┐
│  DETECT, VIA A CONTACT DETECTION SYSTEM, A  │
│  CONTACT BETWEEN THE DEPOSITION ELEMENT AND │
│              THE BUILD SURFACE              │
│                    704                      │
└─────────────────────────────────────────────┘
                      │
                      ▼
┌─────────────────────────────────────────────┐
│ STOP THE MOVING OF THE DEPOSITION ELEMENT IN│
│ RESPONSE TO DETECTING THE CONTACT BETWEEN THE│
│  DEPOSITION ELEMENT AND THE BUILD SURFACE   │
│                    706                      │
└─────────────────────────────────────────────┘
                      │
                      ▼
┌─────────────────────────────────────────────┐
│  MOVE THE DEPOSITION ELEMENT AWAY FROM THE  │
│ BUILD SURFACE A DETERMINED WORKING DISTANCE │
│                    708                      │
└─────────────────────────────────────────────┘
```

*FIG. 7*

CONTACT DETECTION IN ADDITIVE MANUFACTURING

INTRODUCTION

The present disclosure relates to additive manufacturing systems and methods. In particular, aspects of the present disclosure relate to systems and methods for determining a build surface height and setting a working distance between a deposition element and the surface during an additive manufacturing process.

Examples of commercially available additive manufacturing methods include extrusion-based methods (e.g., Fused Deposition Modeling (FDM)), fusing or binding from a powder bed based methods (e.g., Selective Laser Sintering (SLS), Selective laser melting (SLM), and Electron beam melting (EBM)), lamination methods, photopolymerization methods (e.g., stereo lithography), powder- or wire-fed directed energy deposition methods (e.g., direct metal deposition (DMD), laser additive manufacturing (LAM), laser metal deposition (LMD)), and others.

Laser metal deposition (LMD) is a laser-based additive manufacturing process in which metal structures are built up on a substrate or metal layers and structures are applied to existing components (e.g., cladding) in layers. In LMD, a laser generates a molten bath on an existing surface into which metal powder is directed through a nozzle in a deposition head (e.g., using a carrier gas). The powder melts and bonds with the base material in the molten pool thereby forming new layers and ultimately structures additively.

A challenge with additive manufacturing, such as laser metal deposition, is properly setting and maintaining the distance between a deposition element of the additive manufacturing machine and a build surface, such as a substrate or part layer upon which new material is to be deposited, which may be referred to as a working distance. For example, in laser metal deposition, the working distance between the deposition head and a build surface needs to be set correctly so that an optimal melt pool is formed when depositing a layer of a part being built. When the working distance is not set correctly prior to building a layer, the build quality of the additive manufacturing process may suffer due to, for example, irregular layer thickness, wasted material, uneven heating, and the like.

Conventionally, setting the working distance between a deposition element and build surface may be estimated based on a control system's estimate of the location of a deposition head relative to the build surface, such as a substrate, and/or one or more already deposited layers of a part being built. However, the estimated position may be subject to error for many reasons.

For example, when a new deposition head is fitted to an additive manufacturing machine, the distance between the new deposition head and the build surface may change and the control system may not be aware of the change. As another example, where maintenance is done that requires removing, replacing, or otherwise manipulating various parts of an additive manufacturing machine, positions assumed by the control system may diverge from actual positions of system equipment. Further yet, as a normal build progresses, even small irregularities (e.g., in layer thickness) propagated over many layers can lead to significant positioning error, which then leads to more build irregularities, and so on. Moreover, failure to properly determine a build surface location and a working distance between the build surface and a deposition element may result in the deposition element impacting a build surface and thereby damaging machine components as well as a part being built.

Accordingly, what is needed are improved systems and methods for determining a build surface height and setting a working distance between a deposition element and the surface during an additive manufacturing process.

BRIEF SUMMARY

A first aspect provides a method for setting a working distance of an additive manufacturing system, including: moving a deposition element towards a build surface; detecting, via a contact detection system, a contact between the deposition element and the build surface; stopping the moving of the deposition element in response to detecting the contact between the deposition element and the build surface; and moving the deposition element away from the build surface a determined working distance.

A second aspect provides an additive manufacturing system, including: a memory, comprising computer-executable instructions; a processor configured to execute the computer-executable instructions and cause the additive manufacturing system to: move a deposition element towards a build surface; detect, via a contact detection system, a contact between the deposition element and the build surface; stop movement of the deposition element in response to a detection of the contact between the deposition element and the build surface; and move the deposition element away from the build surface a determined working distance.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for determining a build surface height and setting a working distance between a deposition element and the surface during an additive manufacturing process.

Setting a proper working distance between a deposition element (e.g., a deposition head of a laser metal deposition system) and a build surface (e.g., a substrate or layer of a part being built) is an important aspect to improving the quality of additive manufacturing. In order to set the proper working distance, it is beneficial to know the position of the build surface (e.g., its height relative to some reference system) so that the distance between the build surface and the deposition element may be set with a high degree of accuracy.

While it is possible to manually measure the working distance between a deposition element and a build surface so that manual adjustments may be made in a control system (e.g., as a working distance parameter), such manual measurements may significantly decrease the speed of building a part—especially where the measurements need to be repeated from time to time during the build process. Further, manual measurements are subject to human measurement and input errors, and require an operator to access potentially hazardous or sensitive environments, such as within an environmentally-controlled build volume of an additive manufacturing machine. For example, the build environment may need to be cooled before it is safe for a human operator to access the environment to make a manual measurement. Accordingly, automated methods that are faster and more accurate are preferable.

Embodiments described herein determine a build surface location (e.g., height) by making a controlled contact between an aspect of the additive manufacturing machine, such as a deposition element, and the build surface. Thereafter, a working distance is set by moving the aspect of the additive manufacturing machine away from the build surface to a set working distance. Beneficially, this method can be performed when initializing a build of a new part as well as between successive layers of the build. In other words, the method can be used to determine a position (e.g., height) of a building substrate as well as a position of an already deposited layers. Further, the method can be performed quickly and without the need to disturb the build environment (e.g., without the need to expose a part to environmental gases when processing is being performed in a controlled atmosphere within a build volume).

As further described herein, multiple methods for determining a contact between an aspect of the additive manufacturing machine, such as a deposition element, and the build surface may be used concurrently (or alternatively) to ensure reliable contact detection. Each of these contact detection methods may be used to determine a position (e.g., height) of a build surface and then to set an appropriate working distance.

Figure 3A:
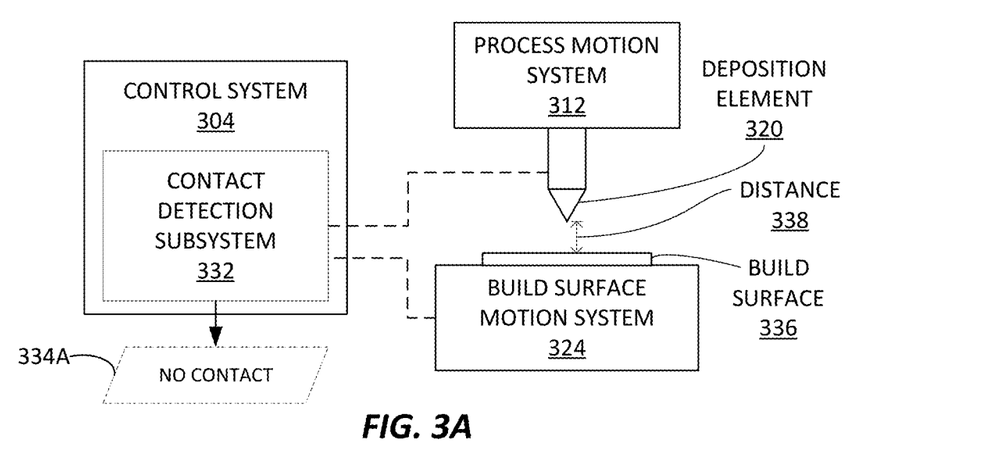
FIGS. 3A-3C depict examples of a contact detection system for an additive manufacturing system.
Figure 3B:
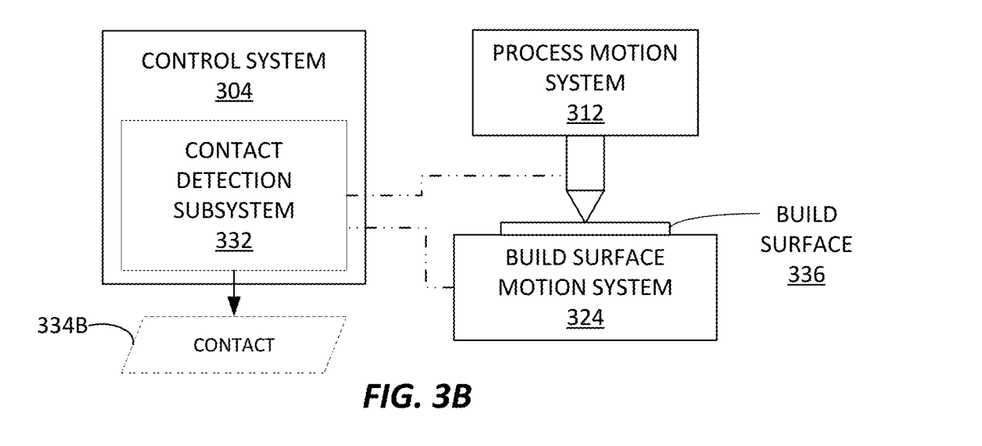
Figure 3C:
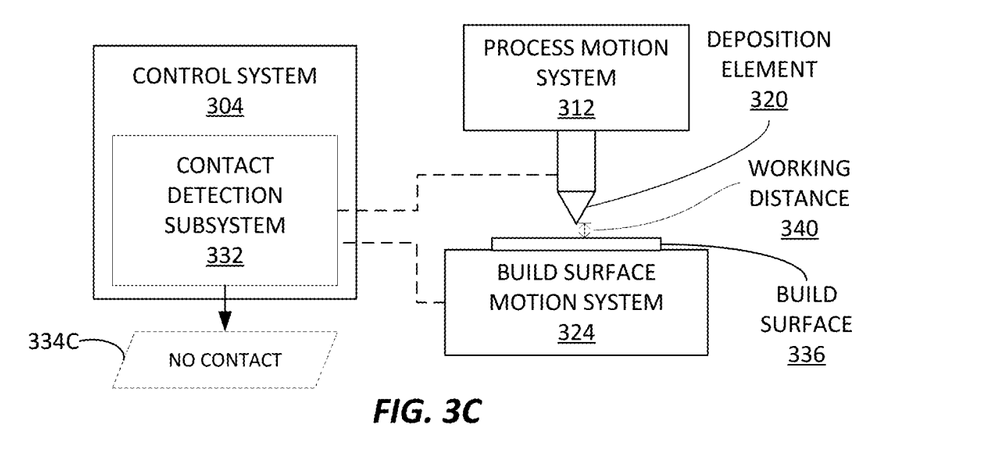

For example, a first method for determining a contact may be based on determining a change in an electrical parameter caused by the contact, such as a measured resistance or impedance within a circuit formed as a result of the contact. Because additive manufacturing systems may use many conductive metallic parts, it is possible to form circuits between those parts and a build surface that is also made of a metallic and/or conductive material. FIGS. 3A-3C depict and describe one possible embodiment of an electrical circuit-based contact detection system.

Figure 4:
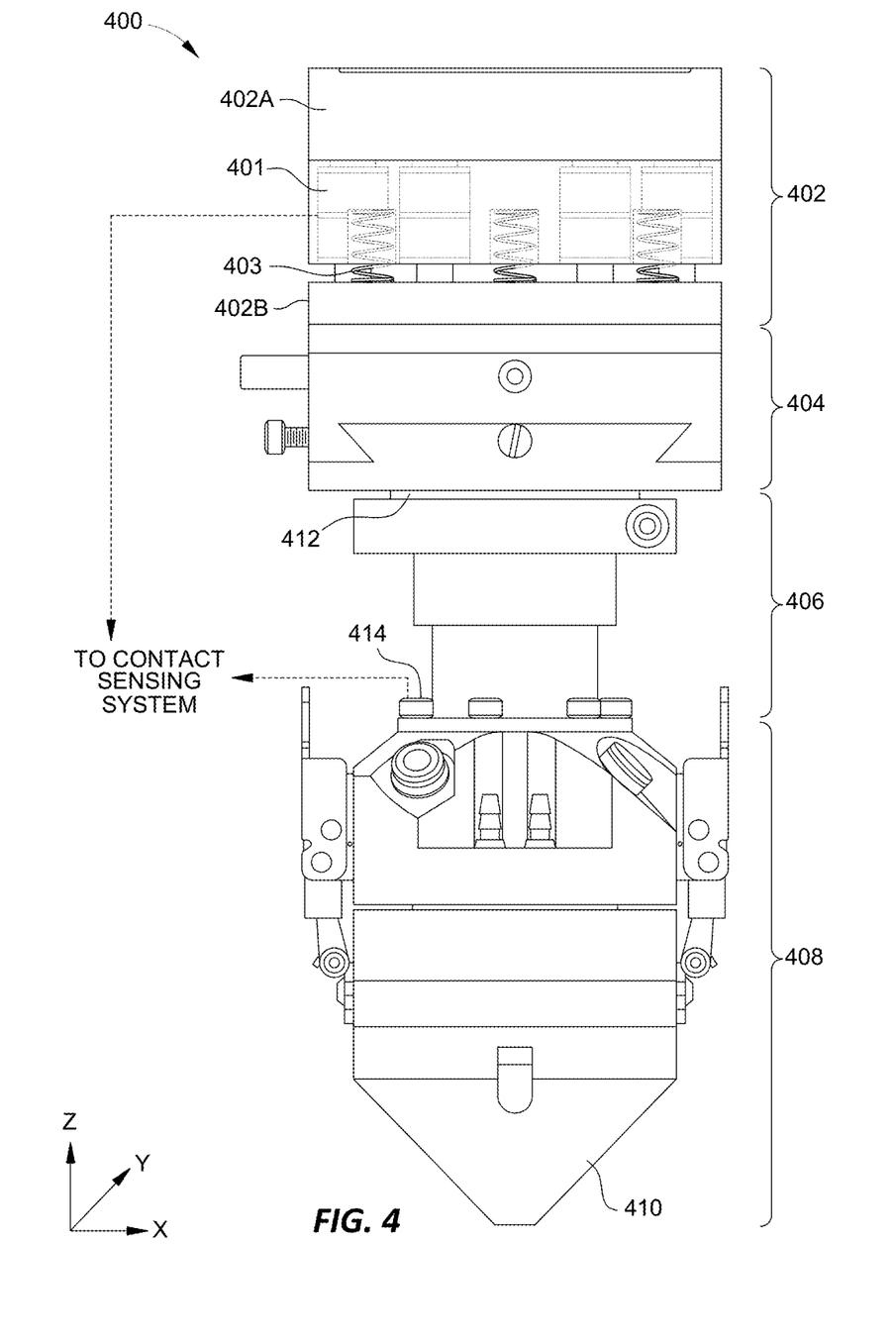
FIG. 4 depicts an example deposition assembly including a compliance device, which may be used for contact detection in an additive manufacturing system.

A second method for determining the contact may be based on a deflection or movement of a compliant element of the additive processing system, such as a mechanical compliance device installed as part of the deposition system and configured to deflect when a contact is made. FIG. 4 depicts and describes one possible embodiment of a compliance-based detection system.

Figure 6:
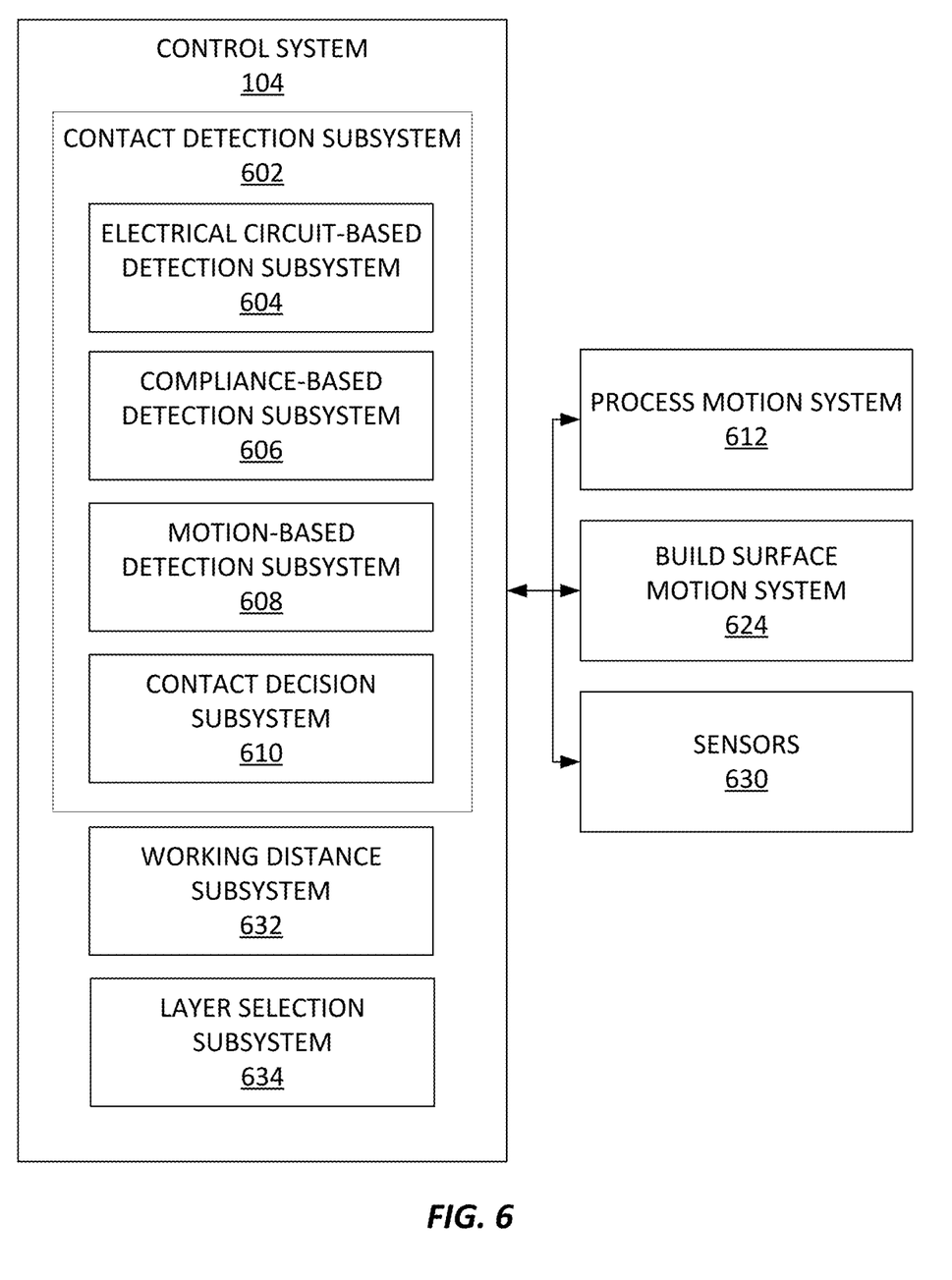
FIG. 6 depicts aspects of a control system with various subsystems for detecting contact, setting a working distance, and selecting a layer for deposition.

A third method for determining the contact may be based on a change in an operational parameter in the additive manufacturing machine, such as a change in motor torque or strain on a motor that moves the aspect of the additive manufacturing machine, such as the deposition element, into contact with the build surface. FIG. 6 depicts and describes one possible embodiment of a motion-based detection system.

Notably, the aforementioned methods may be combined to ensure reliable contact detection and thereby reliable position determination and working distance setting. For example, one method may be considered a primary method and other methods may be backup or redundant methods. As another example, the various methods may be used in a voting scheme such that when a majority of the methods determine a contact, then a contact is determined to have been made by the additive manufacturing machine.

Example Additive Manufacturing System

Figure 1:
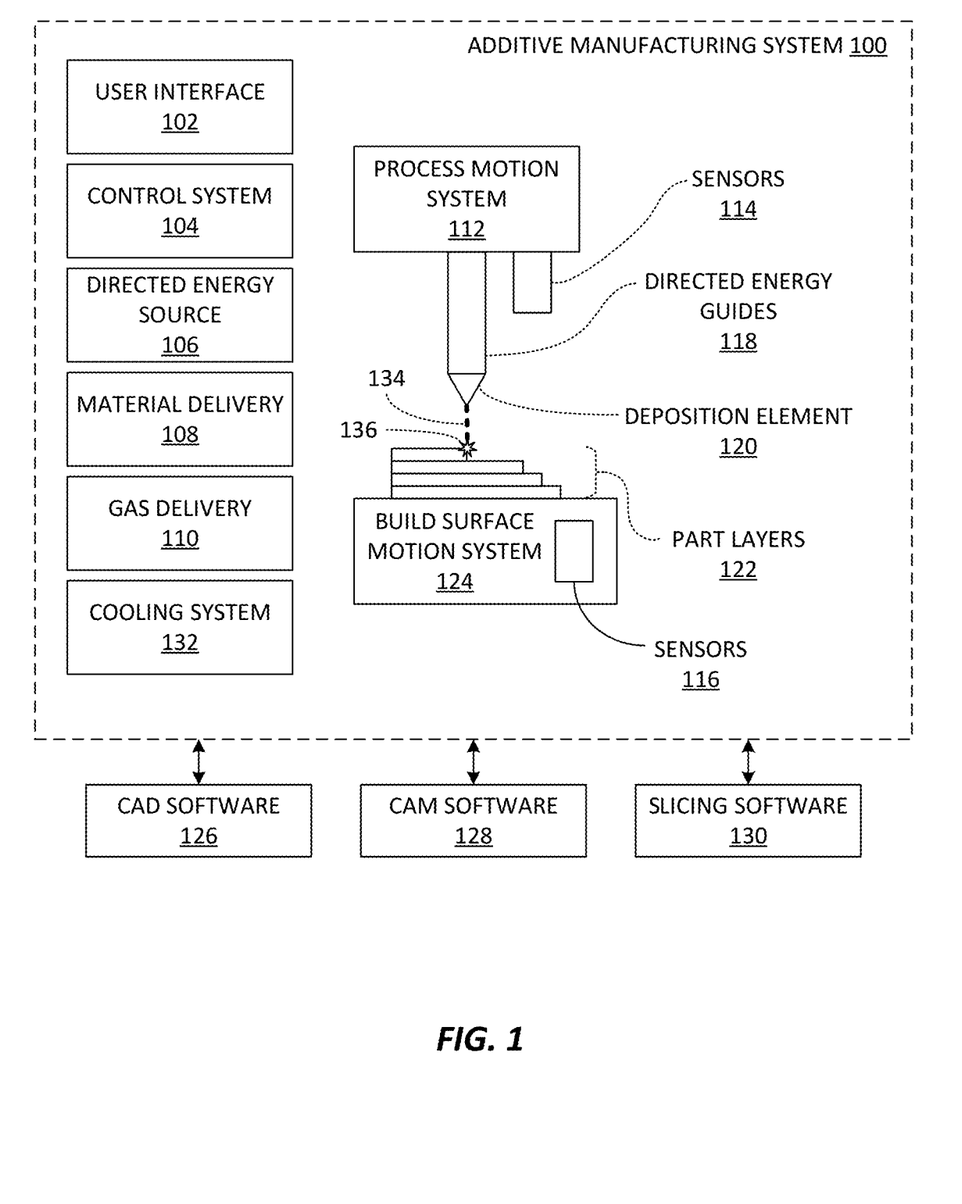
FIG. 1 depicts an example of an additive manufacturing system.

FIG. 1 depicts an example of an additive manufacturing system 100.

In this example, additive manufacturing system 100 includes a user interface 102. User interface 102 may be, for example, a graphical user interface comprising hardware and software controls for controlling additive manufacturing system 100. In some examples, user interface 102 may be integral with additive manufacturing system 100 while in other examples user interface 102 may be remote from additive manufacturing system 100 (e.g., on a remote computer such as a server computer, desktop or laptop computer, or a personal electronic device, such as a smartphone, tablet computer, or a smart wearable device, to name a few examples).

Additive manufacturing system 100 also includes a control system 104. In this example, control system 104 is in data communication with user interface 102 as well as directed energy source 106, material delivery system 108, gas delivery system 110, process motion system 112, sensors 114, sensors 116, build surface motion system 124, and cooling system 132. In other examples, control system 104 may be in data communication with further elements of additive manufacturing system 100, which are not depicted in this example. Further, in other examples, control system 104 may be in data communication with fewer elements of additive manufacturing system 100, such as where another embodiment of an additive manufacturing system includes fewer elements compared to the example of FIG. 1.

Control system 104 may include hardware and software for controlling various aspects of additive manufacturing system 100. For example, control system 104 may include one or more processors, memories, data storages, physical interfaces, software interfaces, software programs, firmwares, and other aspects in order to coordinate and control the various elements of additive manufacturing system 100. In some examples, control system 104 may include network connectivity to various aspects of additive manufacturing system 100 as well as to external networks, such as the Internet and other networks, such as local area networks (LANs) and wide area networks (WANs). In some examples, control system 104 may be a purpose-built logic board, microcontroller, field programmable gate array (FPGA), or the like, while in other examples control system 104 may be implemented by a general purpose computer with specific software components for controlling the various aspects of additive manufacturing system 100.

Control system 104 may generally interpret commands received from user interface 102 and thereafter cause appropriate control signals to be transmitted to other aspects of additive manufacturing system 100. For example, a user may input data representing a part to be processed using additive manufacturing system 100 into user interface 102 and control system 104 may act upon that input to cause additive manufacturing system 100 to process the part.

In some examples, control system 104 may compile and execute machine control codes, such as G-code data, that causes aspects of additive manufacturing machine 100 to operate. For example, the machine control codes may cause process motion system 112 or build surface motion system 124 to move to specific positions and at specific speeds. As another example, the machine control codes may cause directed energy source 106, material delivery system 108, gas delivery system 110, or cooling system 132 to activate or deactivate at specific times, locations, or based on specific conditions, such as operating conditions, sensor readings, and the like. Further, the machine control codes may modulate the operation (e.g., via a settable operational parameter) of the aforementioned aspects of additive manufacturing machine 100, such as by increasing or decreasing the power of directed energy source 106, increasing or decreasing the flow rate of material delivery system 108 or gas delivery system 110, increasing or decreasing amount of cooling by cooling system 132, etc., based on time, location, and/or conditions, such as operating conditions, sensor readings, and the like.

Process motion system 112 may move elements of additive manufacturing system 100 to specified positions. For example, process motion system 112 may position deposition element 120 at a specified distance from a part layer 122 being manufactured, or move deposition element 120 along a preprogrammed path to build up a three-dimensional part.

Additive manufacturing system 100 may include various sensors to monitor and to help control aspects of a manufacturing process through active feedback. In some embodiments, sensors 114 may be connected to process motion system 112 such that the sensors are configured to move with process motion system 112. For example, sensors 114 may include one or more temperature sensor, distance sensors, optical sensors (e.g., camera or video sensors), each of which may be configured to provide operational data during processing by additive manufacturing system 100. For example, temperature sensors may provide point temperature measurements, temperature gradients, heat maps, etc.

In some embodiments, a temperature sensor of sensors 114 may be any sort of sensor capable of measuring temperature to an object. In some examples, the temperature sensor 114 may include a contact-based sensor, such as a thermocouple, while in others, the temperature sensor may be a contact-less sensor, such as a photo or laser-based sensor. One or more temperature sensors may provide various types of temperature data back to control system 104, for example, to provide data for control of directed energy source 106, gas delivery system 110, and cooling system 132 to enable closed-loop control of directed actively cooled gas flows.

In some embodiments, sensors 114 may include various forms of optical sensors (e.g., image and/or camera sensors), such as a visible spectrum optical sensor, or a non-visible spectrum (e.g., infrared) optical sensor. In some examples, the same sensor may be able to provide data in multiple spectrums. Further, additive manufacturing system 100 may include optics that allow for directing, changing (e.g., zoom), and focusing a field of view of an optical sensor. Optical sensors may generally provide various types of image data, including infrared heat data, back to control system 104, for example, to provide data for control of directed energy source 106, gas delivery system 110, and cooling system 132 to enable closed-loop control of directed actively cooled gas flows. For example, an infrared-based optical sensors (e.g., an infrared image sensor) may be used to view heat distributions and gradients in part layers 122.

In some embodiments, various sensors, such as image sensors and contactless temperature and distance sensors, may be configured to have coaxial "views" of an active processing area 136, such as a melt pool created by deposition element 120. For example, a boresight camera or other sensor may be configured with optics that allow for "looking" down the directed energy axis (e.g., axis of beam 134) towards the part being manufactured, such as by using turning mirrors, one-way mirrors, and other optical elements.

Directed energy source 106 may provide any suitable form of directed energy, such as a laser beam (e.g., from a fiber laser) or an electron beam generator, which is capable of melting a manufacturing material, such as a metal powder. Directed energy source 106 may interact with directed energy guides 118 in order to, for example, direct or focus a particular type of directed energy. For example, directed energy guides 118 may comprise one or more optical elements, such as mirrors, lenses, filters, and the like, configured to focus a directed energy beam (e.g., laser beam) at a specific focal point (e.g., active processing area 136) and to control the size of the focal point. In this way, the actual creation of the directed energy beam by directed energy source 106 may be located remote from the manipulation and focusing of the directed energy by directed energy guides 118.

In some embodiments, directed energy source 106 may also be used to remove material from a manufactured part, such as by ablation.

Figure 2:
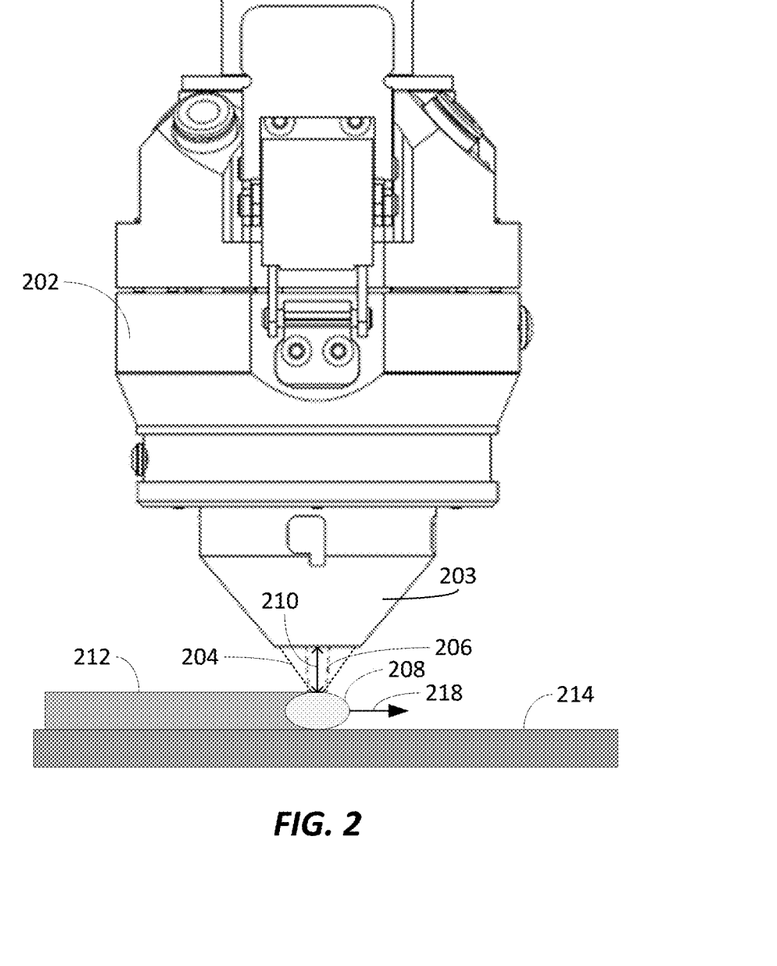
FIG. 2 depicts an example working distance between a deposition element of an additive manufacturing machine and a build surface 214.

Material delivery system 108 may supply building material, such as a powder or wire, to deposition element 120. In some examples, material delivery system 108 may be a remote reservoir including one or more types of raw material (e.g., different types of metal) to be used by additive manufacturing system 100. Material delivery system 108 may be configured to provide one or more materials simultaneously to deposition element 120, such that hybrid mated als (e.g., metal alloys) may be created in party layers 122. FIG. 2 describes an example of a material delivery system that may be used with additive manufacturing system 100.

Deposition element 120 may be connected with material delivery system 108 and may direct material, such as powder, towards a focal point of directed energy beam 134. In this way, material delivery system 108 may help control the amount of material that is additively manufactured at a particular point in time. Deposition element 120 may include nozzles, apertures, and other features for directing material, such as metal powder, towards a manufacturing surface, such as a build surface or previously deposited material layer. In some examples, deposition element 120 may have controllable characteristics, such as controllable nozzle aperture sizes. In some embodiments, deposition element 120 may be a nozzle assembly or deposition head of a laser metal deposition machine.

Gas delivery system 110 may be connected with deposition element 120 to provide propulsive force to the material provided by material delivery system 108, such as by use of carrier gas. In some examples, gas delivery system 110 may modulate the gas flow rate to control material (e.g., powder) flow through deposition element 120 and/or to provide cooling effect during the manufacturing process.

Gas delivery system 110 may include feeds for a plurality of gas flows, such as carrier gas (as described above) as well as shield gas and auxiliary gas flows, such as directed actively cooled gas flows. Gas delivery system 110 may also include feeds for different types of gases so that, for example, different gases may be used for carrier gases, shield gases and auxiliary gases. Gas delivery system 110 may further be configured to provide different gas flows at different rates under the control of control system 104.

Gas delivery system 110 may also be connected with cooling system 132, which may actively cool any of the gas aforementioned gas flows (e.g., carrier, shield, and auxiliary). Cooling system 132 may be configured to apply different amounts of cooling to different gases under the control of control system 104.

Notably, while directed energy source 106, material delivery system 108, gas delivery system 110, sensors 114, sensors 116, directed energy guides 118, and deposition element 120 are shown in an example configuration in FIG. 1, other configurations are possible.

Process motion system 112 may control the positioning of one or more aspects of additive manufacturing system 100, such as sensors 114, sensors 116, and deposition element 120. In some examples, process motion system 112 may be movable in one or more degrees of freedom (e.g., three to six degrees of freedom). For example, process motion system 112 may move and rotate deposition element 120 in and about the X, Y, and Z axes during the manufacturing of part layers 122.

Though not depicted, in various embodiments, process motion system 112 may include cooling elements, such as cooling tubes, fins, channels, lines, and the like. In some embodiments, cooling system 132 may be configured to actively control the temperature of (e.g., to cool) process motion system 112, or parts thereof, such as sensors 114.

Build surface motion system 124 may control the positioning of, for example, a build surface upon which part layers 122 are manufactured. In some examples, build surface motion system 124 may be movable in and about one or more degrees of freedom. For example, build surface motion system 124 may move and rotate the build surface in and about the X, Y, and Z axes during the manufacturing of part layers 122. In some examples, the build surface may be referred to as a build plate or build substrate.

Build surface motion system 124 may also comprise sensors 116, which may include, for example, load sensors, temperature sensors, position sensors, and other sensors that may provide useful information to control system 104. For example, a temperature sensor within build surface motion system may cause control system 104 to increase cooling via cooling system 132, or to decrease power to a directed energy source, and the like.

Though not depicted, in various embodiments, build surface motion system 124 may include cooling elements, such as cooling tubes, fins, channels, and the like. In some embodiments, cooling system 132 may be configured to actively control the temperature of (e.g., to cool) build surface motion system 124, or parts thereof, such as a substrate of build surface motion system 124.

Cooling system 132 may be any sort of active cooling system, such as refrigeration system, a vortex cooler, evaporative gas cooling system, heat pump, and others. Active cooling generally refers to taking an input coolant medium (e.g., fluid or gas) and extracting heat from that coolant medium such that the output coolant medium has a lowered temperature.

Computer-Aided Design (CAD) software 126 may be used to design a digital representation of a part to be manufactured, such as a 3D model. CAD software 126 may be used to create 3D design models in standard data formats, such as DXF, STP, IGS, STL, and others. While shown separate from additive manufacturing system 100 in FIG. 1, in some examples CAD software 126 may be integrated with additive manufacturing system 100.

Slicing software 130 may be used to "slice" a 3D design model into a plurality of slices or design layers. Such slices or design layers may be used for the layer-by-layer additive manufacturing of parts using, for example, additive manufacturing system 100.

Computer-Aided Manufacturing (CAM) software 128 may be used to create machine control codes, for example, G-Code, for the control of additive manufacturing system 100. For example, CAM software 128 may create code in order to direct additive manufacturing system 100 to deposit a material layer along a 2D plane, such as a build surface, in order to build or process a part. For example, as shown in FIG. 1, part layers 122 are manufactured on (e.g., deposited on, formed on, processed on, etc.) build surface motion system 124 using process motion system 112 and deposition element 120.

In some examples, one or more of CAD software 126, CAM software 128, and Slicing Software 130 may be combined into a single piece or suite of software. For example, CAD or CAM software may have an integrated slicing function.

Example Working Distance

FIG. 2 depicts an example working distance 210 between a deposition element 202 (e.g., deposition nozzle 203) of an additive manufacturing machine such as machine 100 in FIG. 1) and a build surface 214.

In particular, FIG. 2 depicts deposition element 202 depositing a layer of new material 212 along the direction of the arrow 218 on a build surface 214, which may be, for example, an existing layer of a part being built or a build substrate. In the depicted example, powdered material 204 is propelled towards the active processing area 208 (a melt pool in this example), which is created by the intersection of the directed energy beam 206 and the powder flow 204, as in a directed energy deposition system, such as a laser metal deposition system.

As above, setting working distance 210 correctly between deposition nozzle 203 and build surface 214 is beneficial to build quality metrics, such as consistency in the layer thickness, surface quality, and other characteristics.

Example Contact Detection Systems

FIGS. 3A-3C depict examples of a contact detection system, which may be used with an additive manufacturing machine, such as depicted and described with respect to FIG. 1.

In the embodiments depicted in FIGS. 3A-3C, contact detection subsystem 332 is depicted as a subsystem of machine control system 304. However, in other embodiments, contact detection subsystem 332 may be a separate system that interfaces with or otherwise provides data and/or control signals to control system 304.

In FIG. 3A, process motion system 312 is controlling the position of a deposition assembly including deposition element 320, which is located above build surface motion system 324 upon which there is a build surface 336. Build surface 336 may be a substrate upon which a first layer of a part may be built, or an existing layer of a part. In FIG. 3A, the distance 338 is either unknown, or only roughly estimated based the position of process motion system 312 and build surface motion system 324. As above, these estimates may be prone to error for a variety of reasons.

Contact detection subsystem 332 is depicted with broken line electrical connections to the deposition assembly as well as to build surface motion system 324. Note that the points of connection in FIG. 3A are arbitrary and any suitable electrical contact point on the deposition assembly and build surface motion system 324 (include build surface 336) could be used in various embodiments.

In FIG. 3A, because deposition element 320 is not in contact with build surface 336, contact detection subsystem 332 is producing a determination 334A of no contact. By contrast, in FIG. 3B, deposition element 320 is in contact with build surface 336, and thus contact detection subsystem 332 is producing a determination 334B of contact.

In this embodiment, contact is determined based on an electrical measurement (or parameter) value changing when contact is made between deposition element 320 and build surface 336. For example, when an electrical circuit is formed by the contact, a change in an electrical measurement, such as resistance, impedance, continuity, capacitance, and the like, may be detected by contact detection subsystem 332. In some cases, the change may be based upon an electrical measurement threshold being exceeded. For example, when there is no contact, a resistance or impedance measure may be greater than 1 mega-Ohm, whereas when there is contact, the resistance or impedance may be less than 1 mega-Ohm. In other cases, the electrical measurement may have a binary output, such as continuity or no continuity, and one of the binary outputs may be the condition representing contact (e.g., continuity). These are just some examples, and many are possible based on various measurable aspects of electronic circuits.

When contact is determined in FIG. 3B, a position of build surface 336 in a build volume, such as a height of build surface 336, may be determined. Because process motion system 312 and build surface motion system 324 may have very precise position encoders, the position(s) of process motion system 312 and/or build surface motion system 324 may be used to determine position of build surface 336 based on known the positions of process motion system 312 and/or build surface motion system 324 at contact.

In some cases, the position of build surface 336 determined based on the contact is an absolute position, while in others it may be a relative position. For example, before building any layers, an initial contact between deposition element 320 and build surface 336 may be used to establish an origin or reference position. For example, where height is the measured in a vertical axis (e.g., Z axis), then an initial contact with build surface 336, which may be a build substrate, may be used to set the zero position for that axis, which is one example of a reference or origin position.

After contact is determined, process motion system 312 and/or build surface motion system 324 may move the deposition element 320 a set working distance 340 away from build surface 336, as depicted in FIG. 3C, so that deposition may commence (or resume). Further, contact detection subsystem 332 is again reporting a determination 334C of no contact once the deposition element is moved to its working distance.

A control system, such as 104 of FIG. 1, may be configured, for example, to perform a contact detection at the beginning of any build and to repeat the contact detection procedure at regular intervals, such as every layer, every other layer, every n layers, or the like.

Example Compliance Device for Deposition Assembly

FIG. 4 depicts an example deposition assembly 400 including a compliance device, which may be used for contact detection in an additive manufacturing machine, such as described above with respect to FIG. 1.

In this example, deposition assembly 400 includes a compliance device 402, alignment device 404, deposition element mounting adapter 406, and deposition head 408, which includes a deposition nozzle 410.

Compliance device 402 allows for deposition assembly 400 to deflect vertically (e.g., in the Z axis direction) when making contact with a build surface, such as described in FIGS. 34-3C. In this particular example, compliance device 402 includes a plurality of shafts and bearings 403 to control the direction of the movement (vertical in this example) as well as a plurality of springs 401 to provide a biasing force to keep compliance device 402 fully extended when deposition head 408 is not in contact with anything.

Though not depicted, compliance device 402 may further include one or more sensors, such as proximity sensors, contact sensors, position sensors, and the like to determine when one portion 402A of compliance device 402 moves relative to the other portion 402B. In such cases, those sensors may provide feedback to a contact detection system, such as contact detection subsystem 332 described with respect to FIGS. 3A-3C or a standalone contact detection system configured to interface with control system 104 in FIG. 1.

Another benefit of compliance device 402 is that it reduces the chance of damage to both deposition assembly 400 and a build surface (not shown) when contact is made because it allows some compliance in the otherwise rigid machine components. This may generally allow the contact detection process to be performed more quickly than when no compliance device is present, in which case deposition assembly 400 may be moved very slowly to avoid damage when contact is made.

Deposition assembly 400 further includes an electrical insulation component 412, which is configured to electrically isolate deposition element mounting adapter 406, and deposition head 408 from the remainder of deposition assembly 400 (and anything else it is connected to). In this example, electrical insulation component 412 is an insulating collar that connects between deposition element mounting adapter 406 and deposition head 408, but in other embodiments other electrical insulation components may be used.

By isolating these components of deposition assembly 400, a circuit can be formed when deposition nozzle 410, which is metallic and conductive, comes into contact with a build surface that is also conductive. In one example, an electrical lead may be attached to a connection point, such as 414, which is part of an electrically conductive path to deposition nozzle 410 by way of the various conductive components of deposition head 408. Electrical (or detection) connection point 414 may beneficially be located to avoid directed energy (e.g., laser) backscatter in, for example, laser metal deposition machines. Note that electrical connection point 414 is just one example, and others are possible so long as there is an electrical path between the point of deposition assembly that will make contact with a build surface (deposition nozzle 410 in this example) and the connection point.

Example Contact Detection Based on Process Motion System Feedback

Figure 5:
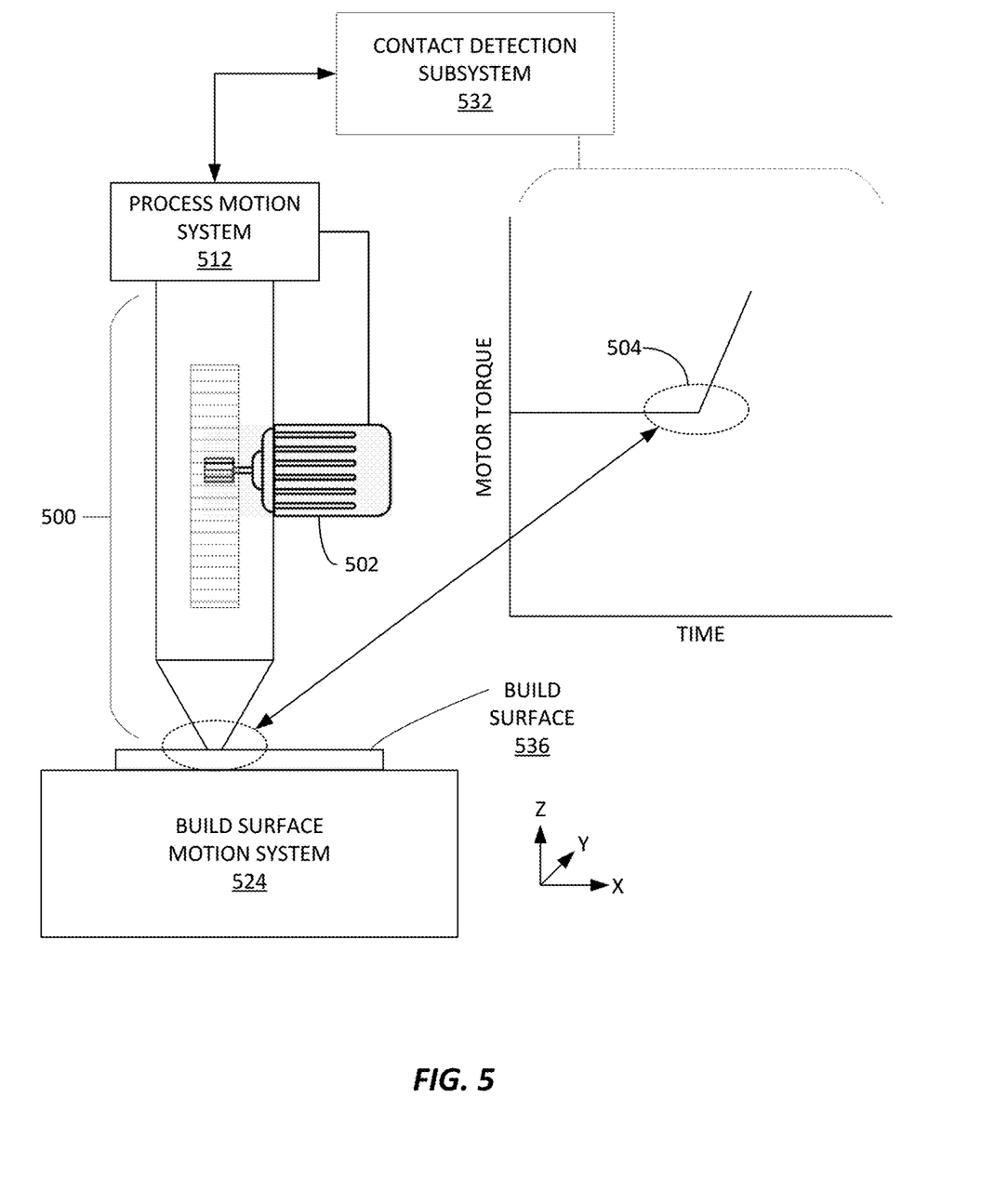
FIG. 5 depicts an example of a motion-based contact detection system for an additive manufacturing system.

FIG. 5 depicts an example of a motion-based contact detection system for an additive manufacturing system.

Process motion systems of additive manufacturing systems are often driven by price electric motors, such as a servo motor or stepper motor to name just a few examples. In the depicted embodiment, electric motor 502 of process motion system 512 is configured to move a deposition assembly 500 in a vertical direction (Z-axis in this example). As motor 512 moves deposition assembly 500 into contact with build surface 536, the torque produced by the motor to try and keep moving the deposition assembly rapidly increases as depicted at 504. This increase may be detected by contact detection subsystem 532 and a determination may be made that the deposition assembly is now in contact with build surface 536.

The same sort of determination could be made when moving build surface motion system 524 instead of (or in conjunction with) process motion system 512.

Note that motor torque is used in this example, but other feedback may be used based on this and other aspects of process motion system 512. For example, aspects of process motion system 512 may monitor a "following error" metric, which is generally the latency between a commanded position and actual position. This following error may be measured by various sensors, encoders, or other movable aspects of the additive manufacturing system, including process motion system 512. For example, electric motor 502, which may be a servo motor, may monitor its following error based on its actual versus commanded position. As electric motor 502 causes deposition assembly 500 to move vertically, it may monitor a following error during the movement. A sudden increase in following error, similar to the sudden increase in motor torque at 504, may indicate that deposition assembly has made contact with build surface 536.

Other operational characteristics may be used in a similar fashion. For example, a change in current or voltage at motor 502 may likewise indicate contact has been made. Further, a strain gauge on the shaft of motor 502 or on an aspect of deposition assembly 500 may indicate contact. These are just a few examples, and others are possible Further, while an electric motor 502 is discussed in this example, other actuating devices may be used, such as electromagnetic, pneumatic, hydraulic, and other types of actuators.

Example Contact Detection Subsystem Interaction

FIG. 6 depicts aspects of control system 104 of FIG. 1 with various subsystems for detecting contact, setting a working distance, and selecting a layer for deposition.

In particular, in this embodiment control system 104 includes a contact detection subsystem 602, which has various detection subsystems, including electrical circuit-based detection subsystem 604, compliance-based detection subsystem 606, and motion-based detection subsystem 608, examples of which are described with respect to FIGS. 3A-3C, 4, and 5. Contact detection subsystem 602 further includes a contact determination component 610 in the depicted embodiment.

Electrical circuit-based detection subsystem 604 is generally configured to detect contact between an aspect of an additive manufacturing system, such as a deposition head as discussed in previous examples, and a build surface based on an electrical measurement changing upon contact, such as a resistance, impedance, continuity, or the like. Because many aspects of additive manufacturing machines, especially directed energy deposition machines, may be made of conductive and/or metallic materials, it is possible to form an electrical circuit when a conductive element of the machine, such as a deposition head, makes contact with a conductive build surface. Thus, with appropriate electrical connections, a circuit may be formed and an electrical measurement determined when the additive manufacturing machine makes contact with the build surface.

Compliance-based detection subsystem 606 is generally configured to detect contact between an aspect of an additive manufacturing system and a build surface based on a compliance component of the additive manufacturing system deflecting upon contact. For example, compliance detection subsystem may be configured to detect a contact of a deposition nozzle with build surface, as described generally with respect to FIGS. 3A-3C. As described above with respect to FIG. 4, this deflection may be measured by various types of sensors in the compliance component.

Motion-based detection subsystem 608 is generally configured to detect contact between an aspect of an additive manufacturing system and a build surface based on feedback from a motion system of an additive manufacturing machine. For example, motion-based detection subsystem 608 may monitor feedback from process motion system 612 (e.g., 112 of FIG. 1), which controls the position of a deposition element or other manufacturing tool of an additive manufacturing machine. Similarly, motion-based detection subsystem 608 may monitor feedback from build surface motion system 624 (e.g., 124 of FIG. 1). As described above with respect to FIG. 5, the feedback may include various operational parameters of the motion systems, such as electric motor torque, electric motor RPM, current, voltage, strain, following error, or the like. Further, motion-based detection subsystem 608 may monitor sensor feedback from sensors 630, such as position sensors or encoders, rotation sensors or encoders, strain sensors, and the like. Notably, these various sensors may also monitor following error, as described in examples above, which can be used for detecting contact.

Contact decision subsystem 610 may generally be configured to monitor output of each of the electrical circuit-based detection subsystem 604, compliance-based detection subsystem 606, and motion-based detection subsystem 608 to make a decision of whether there has been a contact between an aspect of the additive manufacturing system and a build surface when multiple concurrent detection signals are present.

In some embodiments, contact detection subsystem 602 is configured to use one of the detection subsystems as a primary detection subsystem, such as electrical circuit-based detection subsystem 604, and the remaining systems (e.g., compliance-based detection subsystem 606 and motion-based detection subsystem 608) as back-up systems. In other embodiments, contact decision subsystem 610 is configured to use the output of a plurality of the detection subsystems (e.g., 604, 606, and 608) to generate a contact decision, such as a majority vote system wherein the detection outputs (e.g., contact or no contact) of a majority of the detection subsystems is used as the output for contact detection subsystem 602.

Note that while the embodiment in FIG. 6 depicts electrical circuit-based detection subsystem 604, compliance-based detection subsystem 606, and motion-based detection subsystem 608 as subsystems of contact detection subsystem 602, which itself is a subsystem of control system 104, this need not be the case. For example, one or more of electrical circuit-based detection subsystem 604, compliance-based detection subsystem 606, and motion-based detection subsystem 608 may be standalone systems configured to interface with or otherwise send detection data to control system 104, which may then act on the detection data. Further, while detectable contacts have been described with respect to certain example aspects of an additive manufacturing, such as a deposition nozzle, the various contact detection subsystems described herein may work equally with other aspects of an additive manufacturing machine, such as other tooling that may be attached to process motion system 612.

Once a contact is determined by contact detection subsystem 602, control system 104 may determine the position of the build surface that has been contacted. Control system 104 is generally aware of whether any layers have been built already, so control system 104 may determine whether the contact is with a build substrate (e.g., at the beginning of a build process) or with an already deposited layer of a part currently being built. In some embodiments, the position determination may be with respect to one or more axes or dimensions that describe a build volume, such as a height or Z-axis position.

Further, after a contact is determined by contact detection subsystem 602, working distance subsystem 632 may then cause process motion system 612 and/or build surface motion system 624, to set a working distance between an aspect of the additive manufacturing system (e.g., a deposition element) and a build surface. For example, process motion system 612 may cause a deposition assembly to move in the same dimension (e.g., Z-axis) as used to cause the contact, but in an opposite direction, to "back off" the deposition assembly to a set working distance. In one example, the process motion system 612 may be configured to set a working distance between a deposition nozzle and a build surface, such as depicted in FIG. 2.

The set working distance may be preconfigured and stored, for example, in a look-up table or other memory of control system 104, based on the configuration of the additive manufacturing machine. For example, control system 104 may cause working distance subsystem to move the deposition element a predetermined distance based on the particular deposition element that is attached to the additive manufacturing machine. Thus, the set working distance may be different based on different deposition elements or other attachments or configurations of the additive manufacturing system. In some embodiments, control system 104 may be configured to recognize the deposition element that is attached and determine the desired working distance automatically so that working distance subsystem 632 can set the working distance without manual intervention by a machine operator.

Layer selection subsystem 634 may also use the position of the build surface, such as its height, determined by control system 104 based on a detected contact, as a reference for selecting the next layer to of a part to be deposited by the additive manufacturing system. In one embodiment, layer selection subsystem 634 may select a next layer to be deposited using the method described in U.S. Pat. No. 10,569,522, entitled "Dynamic Layer Selection In Additive Manufacturing Using Sensor Feedback", which is incorporated by reference herein in its entirety.

Figure 7:
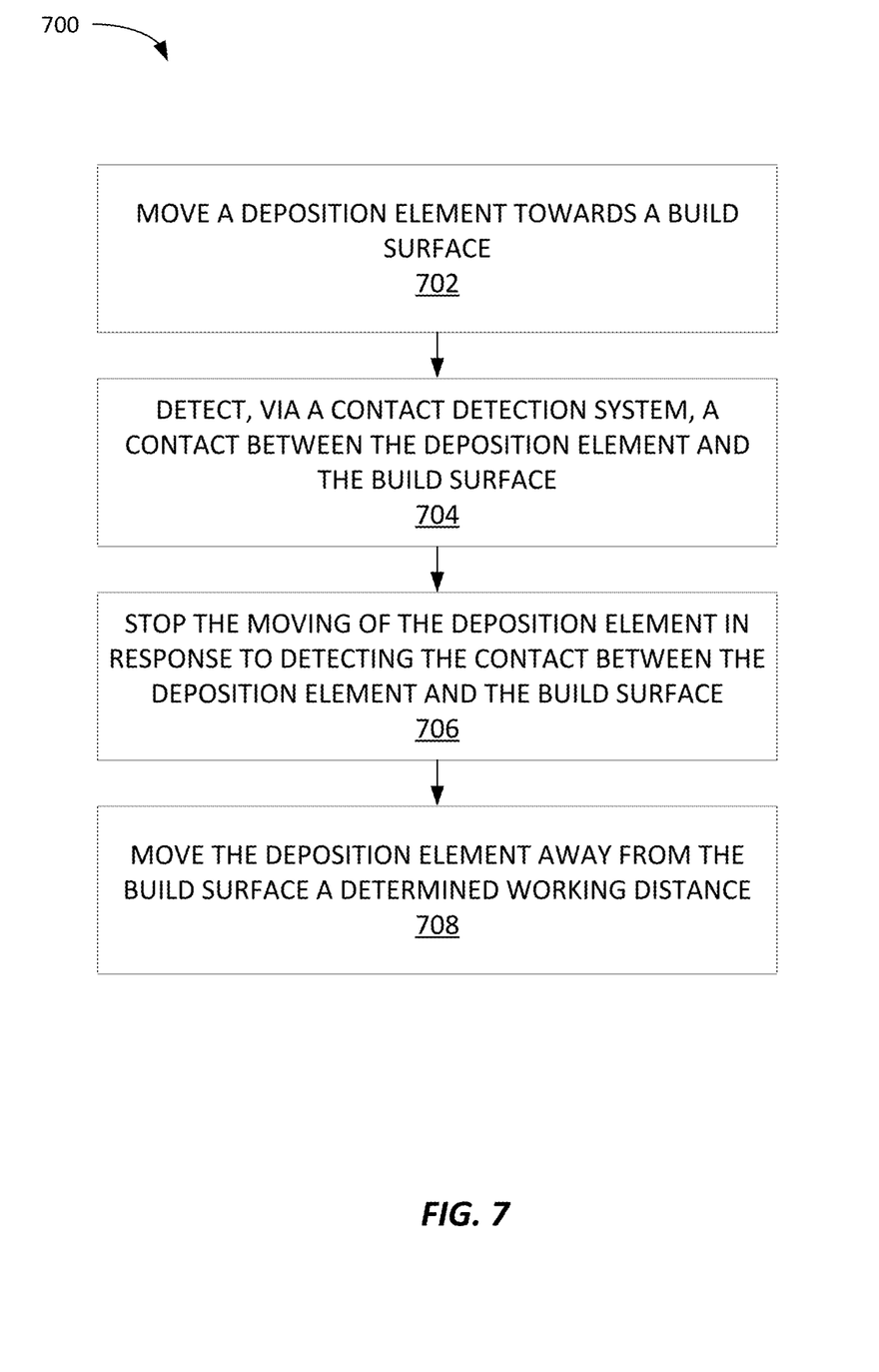
FIG. 7 depicts an example method of operating an additive manufacturing system with a contact detection system.

Example Method of Additive Manufacturing with a Working Distance Measurement System FIG. 7 depicts an example method of operating an additive manufacturing system with a contact detection system (such as system 602 described with respect to FIG. 6).

Method 700 begins at step 702 with moving a deposition element towards a build surface, such as described above with respect to FIG. 3A.

Method 700 then proceeds to step 704 with detecting, via a contact detection system, a contact between the deposition element and the build surface, such as described above with respect to FIGS. 3B, 4, 5, and 6.

Method 700 then proceeds to step 706 with stopping the moving of the deposition element in response to detecting the contact between the deposition element and the build surface.

Method 700 then proceeds to step 708 with moving the deposition element away from the build surface a determined working distance, such as described above with respect to FIG. 3C.

In some embodiments of method 700, detecting via the contact detection system the contact between the deposition element and the build surface comprises detecting a change in an electrical measurement caused by the contact between the deposition element and the build surface, such as described above with respect to FIG. 3B. In some embodiments, an electrical circuit is formed between the contact detection system, the deposition element, and the build surface based on the contact between the deposition element and the build surface. In some embodiments, the electrical measurement comprises one of an electrical resistance, an electrical impedance, or an electrical continuity.

In some embodiments of method 700, detecting via the contact detection system the contact between the deposition element and the build surface comprises determining a deflection within a compliance component attached between a process motion system and the deposition element exceeds a deflection threshold, such as described above with respect to FIG. 4. In some embodiments, determining the deflection comprises receiving a signal from a sensor configured to measure relative movement of a movable portion of the compliance component. In some embodiments, the sensor comprises one of a deflection sensor, a position sensor, or a contact sensor.

In some embodiments of method 700 detecting via the contact detection system the contact between the deposition element and the build surface comprises determining an operational parameter of a process motion system has exceeded a threshold, such as described above with respect to FIG. 5. In some embodiments, the operational parameter is one or more of a torque of a motor in the process motion system configured to control a position of the deposition head, a strain of a motor in the process motion system, or a following error of the motor in the process motion system or another aspect of the process motion system that measures following error.

In some embodiments of method 700, the build surface comprises a substrate upon which a part is to be additively manufactured, and the method further comprises setting a reference position in a build volume based on the position of the deposition element when in contact with the build surface. For example, the reference position may be a zero coordinate position in a coordinate system defining the build volume.

In some embodiments of method 700, the build surface comprises a layer of a part being additively manufactured, and the method further comprises setting a current layer height of the part based on the position of the deposition element when in contact with the build surface. In some embodiments, the method further comprises selecting a next layer for deposition based on the current layer height.

Various aspects of method 700 may be performed by a control system, such as 104 in FIG. 1, as well as contact detection subsystems (or standalone systems) such as described with respect to FIGS. 3A-6.

Example Clauses

Clause 1: A method for setting a working distance of an additive manufacturing system, comprising: moving a deposition element towards a build surface; detecting, via a contact detection system, a contact between the deposition element and the build surface; stopping the moving of the deposition element in response to detecting the contact between the deposition element and the build surface; and moving the deposition element away from the build surface a determined working distance.

Clause 2: The method of Clause 1, wherein detecting via the contact detection system the contact between the deposition element and the build surface comprises detecting a change in an electrical measurement caused by the contact between the deposition element and the build surface.

Clause 3: The method of Clause 2, wherein an electrical circuit is formed between the contact detection system, the deposition element, and the build surface based on the contact between the deposition element and the build surface.

Clause 4: The method of any one of Clauses 2-3, wherein the electrical measurement comprises one of an electrical resistance or an electrical impedance.

Clause 5: The method of any one of Clauses 2-3, wherein the electrical measurement comprises an electrical continuity.

Clause 6: The method of any one of Clauses 1-5, wherein detecting via the contact detection system the contact between the deposition element and the build surface comprises determining a deflection within a compliance component attached between a process motion system and the deposition element exceeds a deflection threshold.

Clause 7: The method of Clause 6, wherein determining the deflection comprises receiving a signal from a sensor configured to measure relative movement of a movable portion of the compliance component.

Clause 8: The method of Clause 7, wherein the sensor comprises one of a deflection sensor or a position sensor.

Clause 9: The method of Clause 7, wherein the sensor comprises a contact sensor.

Clause 10: The method of any one of Clauses 1-9, wherein detecting via the contact detection system the contact between the deposition element and the build surface comprises determining an operational parameter of a process motion system has exceeded a threshold.

Clause 11: The method of Clause 10, wherein the operational parameter is a torque of a motor in the process motion system configured to control a position of the deposition element.

Clause 12: The method of Clause 10, wherein the operational parameter is a following error of a motor in the process motion system configured to control a position of the deposition element.

Clause 13: The method of any one of Clauses 1-12, wherein: the build surface comprises a substrate upon which a part is to be additively manufactured, and the method further comprises setting a reference position in a build volume based on a position of the deposition element when in contact with the build surface.

Clause 14: The method of any one of Clauses 1-13, wherein: the build surface comprises a layer of a part being additively manufactured, and the method further comprises setting a current layer height of the part based on a position of the deposition element when in contact with the build surface.

Clause 15: A processing system, comprising: a memory comprising computer-executable instructions; one or more processors configured to execute the computer-executable instructions and cause the processing system to perform a method in accordance with any one of Clauses 1-14.

Clause 16: A processing system, comprising means for performing a method in accordance with any one of Clauses 1-14.

Clause 17: A non-transitory computer-readable medium comprising computer-executable instructions that, when executed by one or more processors of a processing system, cause the processing system to perform a method in accordance with any one of Clauses 1-14.

Clause 18: A computer program product embodied on a computer-readable storage medium comprising code for performing a method in accordance with any one of Clauses 1-14.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the teen "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for setting a working distance of an additive manufacturing system, comprising:
    moving a deposition element towards a build surface;
    detecting, via a contact detection system, a contact between the deposition element and the build surface by detecting a change in one of an electrical resistance or an electrical impedance caused by the contact between the deposition element and the build surface;
    stopping the moving of the deposition element in response to detecting the contact between the deposition element and the build surface; and
    moving the deposition element away from the build surface a determined working distance.

2. The method of claim 1, wherein an electrical circuit is formed between the contact detection system, the deposition element, and the build surface based on the contact between the deposition element and the build surface.

3. The method of claim 1, further comprising detecting, via the contact detection system, the contact between the deposition element and the build surface by detecting a change in an electrical continuity between the deposition element and the build surface.

4. The method of claim 1, further comprising detecting, via the contact detection system, the contact between the deposition element and the build surface by determining a deflection within a compliance component attached between a process motion system and the deposition element exceeds a deflection threshold.

5. The method of claim 4, wherein:
    determining the deflection comprises receiving a signal from a sensor configured to measure relative movement of a movable portion of the compliance component; and
    the sensor comprises one of a deflection sensor, a position sensor, or a contact sensor.

6. The method of claim 1, wherein:
    the build surface comprises a substrate upon which a part is to be additively manufactured, and
    the method further comprises setting a reference position in a build volume based on a position of the deposition element when in contact with the build surface.

7. The method of claim 1, wherein:
    the build surface comprises a layer of a part being additively manufactured, and
    the method further comprises setting a current layer height of the part based on a position of the deposition element when in contact with the build surface.

8. The method of claim 7, further comprising selecting a next layer for deposition based on the current layer height.

9. The method of claim 1, wherein detecting a change in one of the electrical resistance or the electrical impedance comprises detecting one of the electrical resistance of the electrical impedance exceeds a threshold.

10. An additive manufacturing system, comprising:
    a memory comprising computer-executable instructions;
    a processor configured to execute the computer-executable instructions and cause the additive manufacturing system to:
        move a deposition element towards a build surface;
        detect, via a contact detection system, a contact between the deposition element and the build surface by detecting a change in one of an electrical resistance or an electrical impedance caused by the contact between the deposition element and the build surface;
        stop movement of the deposition element in response to a detection of the contact between the deposition element and the build surface; and
        move the deposition element away from the build surface a determined working distance.

11. The additive manufacturing system of claim 10, wherein:
the additive manufacturing system comprises an electric insulation element configured to electrically isolate a first portion of the additive manufacturing system comprising the deposition element from a second portion of the additive manufacturing system, and
an electrical circuit is formed between the contact detection system, the deposition element, and the build surface based on the contact between the deposition element and the build surface.

12. The additive manufacturing system of claim 10, wherein the processor is further configured to cause the additive manufacturing system to detect, via the contact detection system, the contact between the deposition element and the build surface by determining that a deflection within a compliance component attached between a process motion system and the deposition element exceeds a deflection threshold.

13. The additive manufacturing system of claim 12, wherein:
in order to determine the deflection, the contact detection system is further configured to receive a signal from a sensor configured to measure relative movement of a movable portion of the compliance component, and
the sensor comprises one of a deflection sensor, a position sensor, or a contact sensor.

14. The additive manufacturing system of claim 10, wherein:
the build surface comprises a layer of a part being additively manufactured, and
the processor is configured to cause the additive manufacturing system to set a current layer height of the part based on a position of the deposition element when in contact with the build surface.

15. The additive manufacturing system of claim 14, wherein the processor is further configured to cause the additive manufacturing system to select a next layer for deposition based on the current layer height.

16. The additive manufacturing system of claim 10, wherein detecting a change in one of the electrical resistance or the electrical impedance comprises detecting one of the electrical resistance of the electrical impedance exceeds a threshold.

17. A method for setting a working distance of an additive manufacturing system, comprising:
moving a deposition element towards a build surface;
detecting, via a contact detection system, a contact between the deposition element and the build surface by determining a torque of a motor in the process motion system configured to control a position of the deposition element of the process motion system has exceeded a threshold;
stopping the moving of the deposition element in response to detecting the contact between the deposition element and the build surface; and
moving the deposition element away from the build surface a determined working distance.

18. The method of claim 17, further comprising detecting, via the contact detection system, the contact between the deposition element and the build surface by determining a deflection within a compliance component attached between a process motion system and the deposition element exceeds a deflection threshold.

19. The method of claim 18, wherein:
determining the deflection comprises receiving a signal from a sensor configured to measure relative movement of a movable portion of the compliance component; and
the sensor comprises one of a deflection sensor, a position sensor, or a contact sensor.

20. The method of claim 17, wherein:
the build surface comprises a substrate upon which a part is to be additively manufactured, and
the method further comprises setting a reference position in a build volume based on a position of the deposition element when in contact with the build surface.

21. The method of claim 17, wherein:
the build surface comprises a layer of a part being additively manufactured, and
the method further comprises setting a current layer height of the part based on a position of the deposition element when in contact with the build surface.

22. The method of claim 21, further comprising selecting a next layer for deposition based on the current layer height.

23. An additive manufacturing system, comprising:
a memory comprising computer-executable instructions;
a processor configured to execute the computer-executable instructions and cause the additive manufacturing system to:
move a deposition element towards a build surface;
detect, via a contact detection system, a contact between the deposition element and the build surface by determining a torque of a motor in the process motion system configured to control a position of the deposition element of the process motion system has exceeded a threshold;
stop movement of the deposition element in response to a detection of the contact between the deposition element and the build surface; and
move the deposition element away from the build surface a determined working distance.

24. The additive manufacturing system of claim 23, wherein the processor is further configured to cause the additive manufacturing system to detect, via the contact detection system, the contact between the deposition element and the build surface by determining that a deflection within a compliance component attached between a process motion system and the deposition element exceeds a deflection threshold.

25. The additive manufacturing system of claim 24, wherein:
in order to determine the deflection, the contact detection system is further configured to receive a signal from a sensor configured to measure relative movement of a movable portion of the compliance component, and
the sensor comprises one of a deflection sensor, a position sensor, or a contact sensor.

26. The additive manufacturing system of claim 23, wherein:
the build surface comprises a layer of a part being additively manufactured, and
the processor is configured to cause the additive manufacturing system to set a current layer height of the part based on a position of the deposition element when in contact with the build surface.

27. The additive manufacturing system of claim 26, wherein the processor is further configured to cause the additive manufacturing system to select a next layer for deposition based on the current layer height.

* * * * *